(12) United States Patent
Mashiyama

(10) Patent No.: US 9,150,052 B2
(45) Date of Patent: Oct. 6, 2015

(54) PNEUMATIC TIRE

(75) Inventor: Tatsuya Mashiyama, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 14/346,586

(22) PCT Filed: Sep. 22, 2011

(86) PCT No.: PCT/JP2011/071684
§ 371 (c)(1),
(2), (4) Date: May 14, 2014

(87) PCT Pub. No.: WO2013/042255
PCT Pub. Date: Mar. 28, 2013

(65) Prior Publication Data
US 2014/0305566 A1 Oct. 16, 2014

(51) Int. Cl.
B60C 3/00 (2006.01)
B60C 3/04 (2006.01)
B60C 11/00 (2006.01)
B60C 11/01 (2006.01)
B60C 9/18 (2006.01)
B60C 9/20 (2006.01)
B60C 9/22 (2006.01)

(52) U.S. Cl.
CPC ... B60C 9/18 (2013.01); B60C 9/20 (2013.01); B60C 9/22 (2013.01); B60C 11/0083 (2013.04)

(58) Field of Classification Search
CPC ............ B60C 3/00; B60C 3/04; B60C 11/00; B60C 11/0083; B60C 11/01
See application file for complete search history.

(56) References Cited

U.S. PATENT DOCUMENTS

| 6,116,311 A * | 9/2000 | Ueyoko et al. ................ 152/531 |
| 6,701,988 B2 * | 3/2004 | Yamaguchi ................... 152/539 |
| 2009/0250156 A1 * | 10/2009 | Bigogno et al. .............. 156/123 |
| 2010/0116402 A1 | 5/2010 | Isobe |

FOREIGN PATENT DOCUMENTS

| EP | 872361 | * 10/1998 |
| EP | 2191983 | * 6/2010 |
| JP | 09254607 | * 9/1997 |
| JP | 2009-073337 | 4/2009 |
| JP | 2009-101909 | 5/2009 |
| WO | WO 2012/055677 | * 5/2012 |

OTHER PUBLICATIONS

Machine translation of JP 09254607, 1997.*
International Search Report dated Jan. 10, 2012, 2 pages, Japan.

* cited by examiner

*Primary Examiner* — Justin Fischer
(74) *Attorney, Agent, or Firm* — Thorpe North & Western

(57) ABSTRACT

A pneumatic tire includes the belt layer that is formed by laminating the circumferential reinforcing layer and the pair of cross belts. Also, the tire external diameter R at the point of intersection O of the tire equatorial plane CL and the tread profile, the distance D1 in the tire radial direction between the tire ground contact edge T and the point of intersection O, and the distance D2 in the tire radial direction between the foot X of the line drawn from the end portion on the outer side in the tire width direction of the circumferential reinforcing layer 145 normal to the tread profile and the point of intersection O have a relationship such that $0.010 \leq D1/R \leq 0.015$ and $0.27 \leq D2/D1 \leq 0.3$.

17 Claims, 5 Drawing Sheets

| | Conventional Example | Working Example 1 | Working Example 2 | Working Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| D1/R | 0.016 | 0.013 | 0.010 | 0.015 | 0.009 | 0.016 | 0.020 | 0.013 | 0.013 | 0.013 |
| D2/D1 | 0.26 | 0.29 | 0.27 | 0.30 | 0.26 | 0.31 | 0.29 | 0.26 | 0.35 | 0.35 |
| D3/D1 | 0.70 | 0.75 | 0.72 | 0.72 | 0.72 | 0.72 | 0.70 | 0.70 | 0.70 | 0.85 |
| Ws/TDW | 0.65 | 0.75 | 0.70 | 0.70 | 0.70 | 0.70 | 0.75 | 0.75 | 0.75 | 0.75 |
| Uneven wear resistance performance | 100 | 115 | 107 | 107 | 100 | 100 | 100 | 100 | 100 | 100 |
| Belt durability | 100 | 100 | 100 | 100 | 98 | 100 | 100 | 100 | 98 | 98 |

| | Working Example 4 | Working Example 5 | Working Example 6 | Working Example 7 | Working Example 8 | Working Example 9 | Working Example 10 | Comparative Example 7 | Working Example 11 | Working Example 12 | Working Example 13 |
|---|---|---|---|---|---|---|---|---|---|---|---|
| D1/R | 0.012 | 0.012 | 0.012 | 0.012 | 0.013 | 0.012 | 0.013 | 0.008 | 0.013 | 0.013 | 0.012 |
| D2/D1 | 0.28 | 0.28 | 0.28 | 0.28 | 0.29 | 0.28 | 0.29 | 0.29 | 0.29 | 0.29 | 0.28 |
| D3/D1 | 0.60 | 0.80 | 0.59 | 0.81 | 0.63 | 0.72 | 0.70 | 0.63 | 0.70 | 0.70 | 0.72 |
| Ws/TDW | 0.75 | 0.75 | 0.75 | 0.75 | 0.65 | 0.80 | 0.65 | 0.65 | 0.60 | 0.85 | 0.90 |
| Uneven wear resistance performance | 105 | 105 | 103 | 103 | 104 | 105 | 104 | 100 | 103 | 107 | 108 |
| Belt durability | 100 | 100 | 100 | 100 | 100 | 100 | 100 | 98 | 100 | 99 | 97 |

FIG. 5

PNEUMATIC TIRE

TECHNICAL FIELD

The present invention relates to a pneumatic tire, and more specifically, to a pneumatic tire having improved uneven wear resistance.

BACKGROUND

In recent years, tires have been provided with a circumferential reinforcing layer in a belt layer in order to suppress radial growth of tires. The technology described in Japanese Unexamined Patent Application Publication No. 2009-73337A is a known conventional pneumatic tire that is configured in this manner. However, in a configuration in which the belt layer has a circumferential reinforcing layer, the amount of change in diameter before and after driving differs greatly between a region where the circumferential reinforcing layer is disposed, and a region on an outer side in a tire width direction from the circumferential reinforcing layer, and there is the problem that tire uneven wear can easily occur (in particular, step wear of a shoulder land portion).

SUMMARY

The present technology provides a pneumatic tire whereby uneven wear resistance can be enhanced. The pneumatic tire according to the present invention includes a belt layer that is formed by laminating a pair of cross belts and a circumferential reinforcing layer. In such a pneumatic tire, a tire external diameter R at a point of intersection O of a tire equatorial plane and a tread profile, a distance D1 in a tire radial direction between a tire ground contact edge T and the point of intersection O, and a distance D2 in the tire radial direction between a foot X of a line drawn from an end portion on the outer side in the tire width direction of the circumferential reinforcing layer normal to the tread profile have a relationship such that $0.010 \leq D1/R \leq 0.015$ and $0.27 \leq D2/D1 \leq 0.3$.

In the pneumatic tire according to the present invention, in the configuration in which the belt layer includes the circumferential reinforcing layer, the amount of uneven wear of the shoulder land portion is determined with the end portion on the outer side in the tire width direction of the circumferential reinforcing layer as criterion. As a result, this has the advantage that the ground contact shape of the tire is made appropriate, and the uneven wear resistance performance of the tire is increased.

BRIEF DESCRIPTION OF THE DRAWINGS

FIG. 5 is a table showing results of performance testing of pneumatic tires according to embodiments of the present invention.

DETAILED DESCRIPTION

The present invention is described below in detail with reference to the accompanying drawing. However, the present invention is not limited to these embodiments. Moreover, constituents of the embodiment which can possibly or obviously be substituted while maintaining consistency with the present invention are included. Furthermore, the multiple modified examples described in the embodiment can be combined as desired within a scope apparent to a person skilled in the art.

Pneumatic Tire

Figure 1:
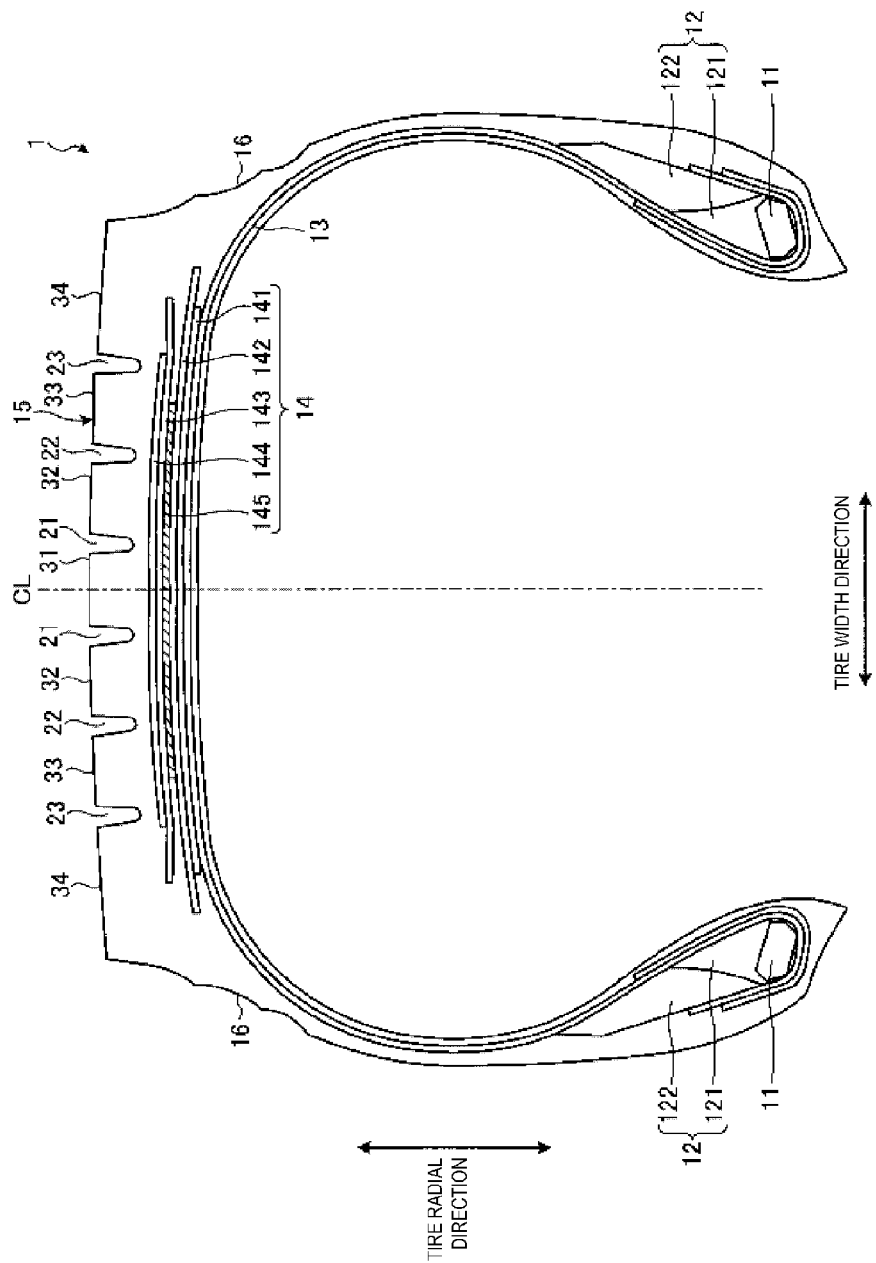
FIG. 1 is a cross-sectional view in a tire meridian direction illustrating a pneumatic tire according to an embodiment of the present invention.

FIG. 1 is a cross-sectional view in a tire meridian direction illustrating a pneumatic tire 1 according to an embodiment of the present invention. This drawing illustrates a radial tire for heavy loads that is mounted on the steer axles of trucks and buses for long distance transport as an example of the pneumatic tire 1.

The pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in a tire radial direction so as to reinforce the bead portions. The carcass layer 13 has a single-layer structure, and stretches between the left and right bead cores 11 and 11 in toroidal form, forming a framework for the tire. Additionally, both end portions of the carcass layer 13 are folded toward an outer side in a tire width direction so as to envelop the bead cores 11 and the bead fillers 12, and fixed. The belt layer 14 is formed from a plurality of belt plies 141 to 145 that are laminated, and the belt layer 14 is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire.

Additionally, the pneumatic tire 1 has a plurality of circumferential main grooves 21 to 23 extending in a tire circumferential direction, a plurality of lug grooves extending in the tire width direction (not illustrated on the drawings), and a plurality of land portions 31 to 34 partitioned by the circumferential main grooves 21 to 23 and the lug grooves in the tread portion. Thereby, a block-based tread pattern is formed (not illustrated on the drawings). However, the configuration is not limited thereto, and the pneumatic tire 1 may have a rib pattern (not illustrated on the drawings). The circumferential main grooves 21 to 23 may be straight grooves, or they may be zigzag grooves.

In this embodiment, the pneumatic tire 1 has a symmetric structure to the left and right of the tire equatorial plane CL as center.

Figure 2:
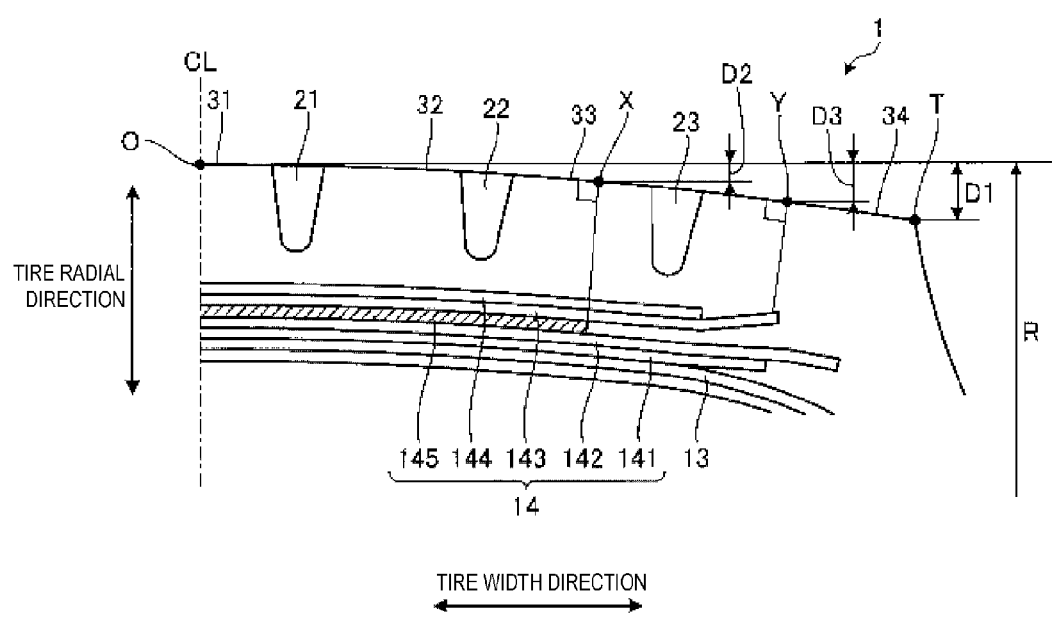
FIG. 2 is an explanatory view illustrating a shoulder portion of the pneumatic tire depicted in FIG. 1.
Figure 3:
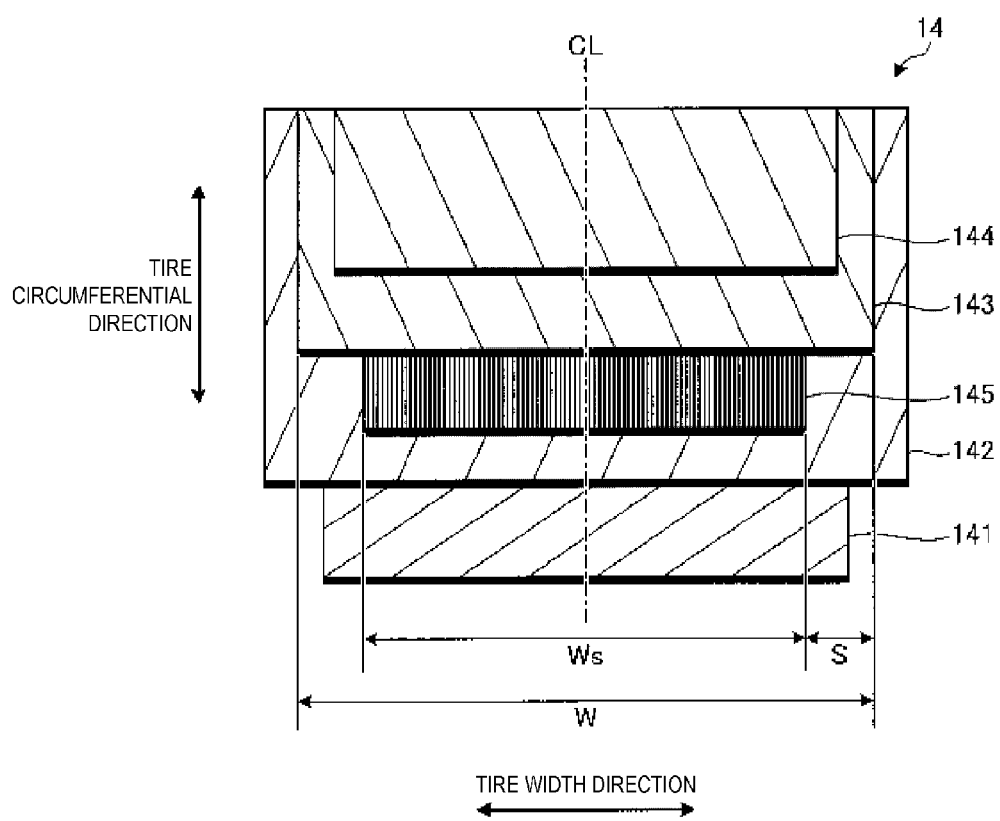
FIG. 3 is an explanatory view illustrating a belt layer of the pneumatic tire depicted in FIG. 1.

FIG. 2 is an explanatory view illustrating a shoulder portion of the pneumatic tire 1 depicted in FIG. 1. FIG. 3 is an explanatory view illustrating the belt layer 14 of the pneumatic tire 1 depicted in FIG. 1. In these drawings, FIG. 2 illustrates a region on one side of the tread portion demarcated by the tire equatorial plane CL, and FIG. 3 illustrates the laminated structure of the belt layer 14.

Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85 [deg] and not more than 95 [deg].

The belt layer 14 is formed by laminating a large angle belt 141, a pair of cross belts 142, 143, a belt cover 144, and a circumferential reinforcing layer 145, and wound around the periphery of the carcass layer 13 (see FIG. 2).

The large angle belt 141 is constituted by a plurality of belt cords formed from steel or organic fibers covered by a coating rubber and subjected to a rolling process, and has a belt angle (inclination angle of the belt cords in a fiber direction with respect to the tire circumferential direction), as an absolute value, of not less than 40 [deg] and not more than 60 [deg]. Also, the large angle belt 141 is disposed laminated on the outer side in the tire radial direction of the carcass layer 13.

The pair of cross belts 142, 143 is constituted by a plurality of belt cords formed from steel or organic fibers covered by a coating rubber and subjected to a rolling process, and has a belt angle, as an absolute value, of not less than 10 [deg] and not more than 30 [deg]. Further, each of the belts of the pair of cross belts 142, 143 has a belt angle denoted with a mutually different symbol, and the belts are laminated so as to intersect each other in the belt cord fiber directions (crossply configuration). In the following description, the cross belt 142 positioned on the inner side of the tire radial direction is referred to as "inner-side cross belt", and the cross belt 143 positioned on the outer side of the tire radial direction is referred to as "outer-side cross belt". Three or more cross belts may be disposed laminated (not illustrated on the drawings). Also, the pair of cross belts 142, 143 is disposed laminated on the outer side in the tire radial direction of the large angle belt 141.

The belt cover 144 is constituted by a plurality of belt cords formed from steel or organic fibers covered by a coating rubber and subjected to a rolling process, and has a belt angle, as an absolute value, of not less than 10 [deg] and not more than 45 [deg]. Also, the belt cover 144 is disposed laminated on the outer side in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is constituted by belt cords formed from a rubber coated steel wire wound spirally at an angle with respect to the tire circumferential direction within a range of ±5 [deg]. Also, the circumferential reinforcing layer 145 is disposed so as to be interposed between the pair of cross belts 142, 143. Also, the circumferential reinforcing layer 145 is disposed on an inner side in the tire width direction from the left and right edge portions of the pair of cross belts 142, 143. Specifically, the circumferential reinforcing layer 145 is formed by winding one or a plurality of wires in a spiral manner around the periphery of the inner-side cross belt 142. The circumferential reinforcing layer 145 improves the tire durability by strengthening the stiffness in the tire circumferential direction.

In the pneumatic tire 1, the belt layer 14 may have an edge cover (not illustrated on the drawings). Normally, the edge cover is constituted by a plurality of belt cords formed from steel or organic fibers covered by a coating rubber and subjected to a rolling process, and has a belt angle, as an absolute value, of not less than 0 [deg] and not more than 5 [deg]. Also, the edge cover is disposed on the outer side in the tire radial direction from the left and right edge portions of the outer-side cross belt 143 (or the inner-side cross belt 142). The edge covers improve the uneven wear resistance performance of the tire by reducing the difference in radial growth between the center area and the shoulder area of the tread portion, by exhibiting a band effect.

Circumferential Reinforcing Layer

Also, in the pneumatic tire 1, the belt cords from which the circumferential reinforcing layer 145 is configured are steel wire, and preferably, the number of ends of the circumferential reinforcing layer 145 is not less than 17 ends/50 mm and not more than 30 ends/50 mm. Also, preferably, the diameter of the belt cord is not less than 1.2 mm and not more than 2.2 mm. In a configuration in which the belt cords are formed from a plurality of cords twisted together, the belt cord diameter is measured as the diameter of a circle that circumscribes the belt cord.

Also, in the pneumatic tire 1, the circumferential reinforcing layer 145 is configured by winding a single steel wire in a spiral manner. However, the configuration is not limited thereto, and the circumferential reinforcing layer 145 may be configured from a plurality of wires wound spirally around side-by-side to each other (multiple winding structure). In this case, preferably, the number of wires is 5 or less. Also, preferably, the width of winding per unit when 5 wires are wound in multiple layers is 12 mm or less. In this way, a plurality (not less than 2 and not more than 5) of wires can be wound properly while inclined with respect to the tire circumferential direction in the range±5 [deg].

Also, in the pneumatic tire 1, (a) the elongation of the belt cords from which the circumferential reinforcing layer 145 is configured when they are components (when they are material prior to forming the green tire) when subjected to a tensile load of 100 N to 300 N is preferably not less than 1.0% and not more than 2.5%. Also, (b) the elongation of the belt cords of the circumferential reinforcing layer 145 when in the tire (the state when taken from the tire product) when subjected to a tensile load of 500 N to 1000 N is preferably not less than 0.5% and not more than 2.0%. The belt cords (high elongation steel wire) have a good elongation ratio when a low load is applied compared with normal steel wire, so they have the property that they can withstand the loads that are applied. Therefore, in the case of (a) above, it is possible to improve the durability of the circumferential reinforcing layer 145 during manufacture, and in the case of (b) above, it is possible to improve the durability of the circumferential reinforcing layer 145 when the tire is used, and these points are desirable. The elongation of the belt cords is measured in accordance with JIS G 3510.

Also, preferably, a width Ws of the circumferential reinforcing layer 145 is within the range such that $0.6 \leq Ws/W$. The width Ws of the circumferential reinforcing layer 145 when the circumferential reinforcing layer 145 has a divided structure (not illustrated on the drawings) is the sum of the widths of each divided portion.

Also, in the configuration illustrated in FIG. 3, the circumferential reinforcing layer 145 is disposed on the inner side in the tire width direction from the left and right edge portions of the narrower cross belt 143 of the pair of cross belts 142, 143 (see FIG. 3). Also, preferably the width W of the narrower cross belt 143 and the distance S from the edge portion of the circumferential reinforcing layer 145 to the edge portion of the narrower cross belt 143 are in the range such that $0.03 \leq S/W$. This point is the same even if the circumferential reinforcing layer 145 has a configuration with a divided structure (not illustrated on the drawings). The width W and the distance S are measured as distances in the tire width direction when viewed as a cross-section in the tire meridian direction. Also, there is no upper limit to the value of S/W in particular, but it is restricted by the relationship of the width Ws of the circumferential reinforcing layer 145 and the width W of the narrower cross belt 143.

Also, preferably, the width Ws of the circumferential reinforcing layer 145 relative to the tire developed width TDW (not illustrated on the drawings) is in the range such that $0.65 \leq Ws/TDW \leq 0.80$. The tire developed width TDW is the linear distance in a developed drawing between the two ends of the tread-patterned portion of the tire mounted on a standard rim to which a regular inner pressure is applied and no load is applied.

Also, in the configuration illustrated in FIG. 2, the circumferential reinforcing layer 145 is interposed between the pair of cross belts 142, 143 (see FIG. 2). However, the configuration is not limited thereto, and the circumferential reinforcing layer 145 may be disposed on the inner side of the pair of cross belts 142, 143. For example, the circumferential reinforcing layer 145 may be disposed (1) between the large angle belt 141 and the inner-side cross belt 142, or (2) between the carcass layer 13 and the large angle belt 141 (not illustrated on the drawings).

Tread Profile on the Shoulder Land Portion

Normally, in a configuration in which a circumferential reinforcing layer is provided in the belt layer, as a result of the band effect of the circumferential reinforcing layer, there is a large difference in the amount of change in the diameter before and after driving between the region where the circumferential reinforcing layer is disposed and the region on the outer side in the tire width direction from the circumferential reinforcing layer, so for example, the amount of radial growth at the end portions of the circumferential reinforcing layer is greatest, and the radial growth of the tire ground contact edges is smaller relatively, so there is the problem that uneven wear can easily occur in the shoulder land portion (in particular shoulder wear and step wear).

Therefore, in the pneumatic tire 1, the following configuration is adopted in order to reduce uneven wear in the shoulder land portion 34.

First, when viewed as a cross-section in the tire meridian direction, the point of intersection of the tire equatorial plane CL and the tread profile is O (see FIG. 2). Also, the tire external diameter at the point of intersection O is R. This tire external diameter R is a diameter. Also, the distance in the tire radial direction between the tire ground contact edge T and the point of intersection O is D1. Also, the distance in the tire radial direction between the foot X of a line drawn from the end portion of the circumferential reinforcing layer 145 on the outer side in the tire width direction normal to the tread profile and the point of intersection O is D2.

In this case, the tire external diameter R, the diameter D1, and the distance D2 have a relationship such that $0.010 \leq D1/R \leq 0.015$ and $0.27 \leq D2/D1 \leq 0.30$.

Also, when viewed as a cross-section in the tire meridian direction, the point at the foot of a line drawn from the end portion on the outer side in the tire width direction of the narrower cross belt (in FIG. 2, the outer-side cross belt 143) of the pair of cross belts 142, 143 normal to the tread profile is Y. Also, the distance in the tire radial direction between the point Y and the point of intersection O is D3.

In this case, the distance D3 and the distance D1 have a relationship such that $0.70 \leq D3/D1 \leq 0.80$.

In the pneumatic tire 1, the amount of uneven wear of the shoulder land portion 34 is determined with the end portion on the outer side in the tire width direction of the circumferential reinforcing layer 145 as criterion. Therefore, under the prescribed condition, the difference in diameter between the region where the circumferential reinforcing layer 145 is disposed and the region on the outer side in the tire width direction from the circumferential reinforcing layer 145 is made appropriate. As a result, the ground contact shape of the tire is made appropriate, and the tire uneven wear resistance performance is increased.

Note that, in the pneumatic tire 1, the tire ground contact edge T is measured in a state where the tire is assembled on a standard rim and inflated to a regular inner pressure, and a prescribed air pressure is applied.

Also, the tire external diameter R and the distances D1 to D3 are defined in the state where the tire is assembled on a standard rim and inflated to a regular inner pressure under no load. In this case, the following method of measurement is used, for example. First, a tire unit is applied to the imaginary line of a tire profile measured by a laser profiler and fixed with tape or the like. Then, the gauge that is to be measured is measured with a calipers or the like. The laser profiler used here is a tire profile measuring device (manufactured by Matsuo Co., Ltd.).

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Modified Examples

Figure 4:
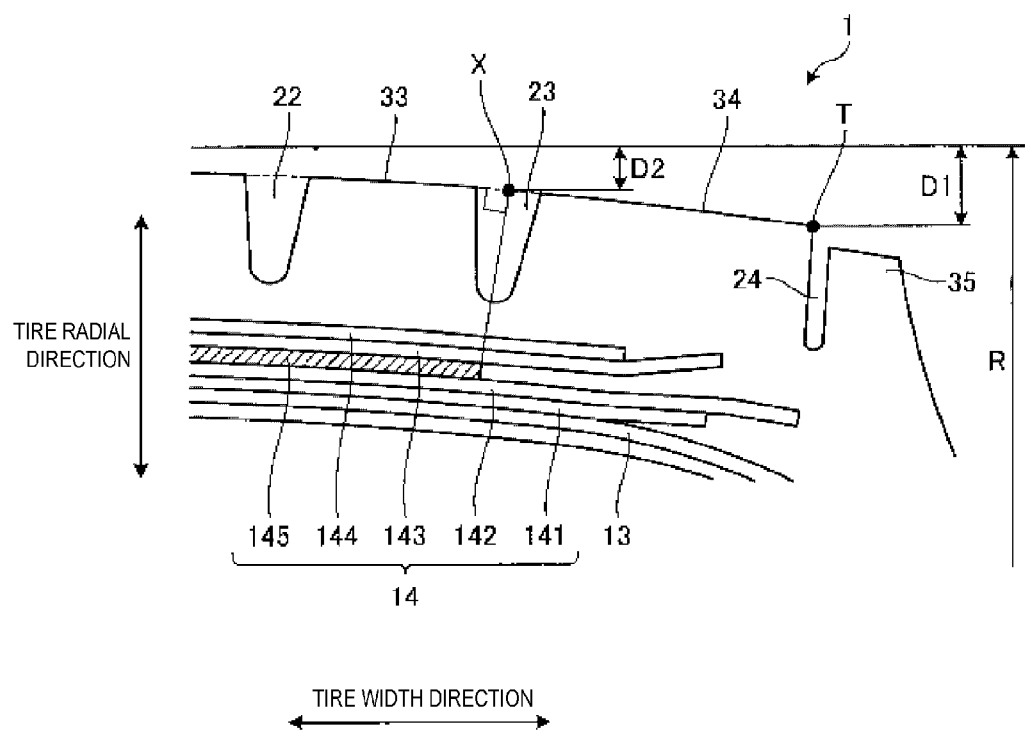
FIG. 4 is an explanatory view illustrating a modified example of the pneumatic tire 1 depicted in FIG. 1.

FIG. 4 is an explanatory view illustrating a modified example of the pneumatic tire 1 depicted in FIG. 1. In FIG. 4, constituents that are the same as those described for the configuration depicted in FIG. 2 are assigned the same reference numerals and descriptions thereof are omitted.

The pneumatic tire 1 in FIG. 4 includes a narrow groove 24 extending in the tire circumferential direction, and a narrow rib 35 that is partitioned by the narrow groove 24, in the edge portion on the outer side in the tire width direction of the shoulder land portion 34. Also, the tread of the narrow rib 35 is offset on the inner side in the tire radial direction relative to the tread of the shoulder land portion 34. In such a configuration, when the tire rotates, the narrow rib 35 functions as a so-called sacrificial rib, so the uneven wear of the shoulder land portion is suppressed.

Here, in the configuration having the narrow rib 35 as described above, regardless of whether or not the narrow rib 35 contacts the ground under the prescribed measuring conditions, the distance D1 is measured taking the edge portion (the edge portion partitioned by the narrow groove 24) on the outer side in the tire width direction of the shoulder land portion 34 to be the tire ground contact edge T. In other words, the tire shape is made appropriate using the edge portion of the shoulder land portion 34 for which uneven wear is to be suppressed as criterion. As a result, the uneven wear resistance performance of the tire is enhanced.

As illustrated in FIG. 4, when the foot X of the line drawn from the circumferential reinforcing layer 145 normal to the tread profile is on the circumferential main groove 23, the foot X is drawn using an imaginary line for the tread profile, to measure the distance D2.

Likewise, when the circumferential main groove 21 is on the tire equatorial plane CL (not illustrated on the drawings), the point O is drawn using an imaginary line for the tread profile, to measure the tire external diameter R.

Effect

As described above, the pneumatic tire 1 includes the belt layer 14 in which the circumferential reinforcing layer 145 and the pair of cross belts 142, 143 are laminated (see FIG. 3). Also, the tire external diameter R at the point of intersection O of the tire equatorial plane CL and the tread profile, the distance D1 in the tire radial direction between the tire ground contact edge T and the point of intersection O, and the distance D2 in the tire radial direction between the foot X of the line drawn from the end portion on the outer side in the tire width direction of the circumferential reinforcing layer 145 normal to the tread profile and the point of intersection O have a relationship such that $0.010 \leq D1/R \leq 0.015$ and $0.27 \leq D2/D1 \leq 0.3$.

In such a configuration, in the configuration in which the belt layer 14 includes the circumferential reinforcing layer 145, the amount of uneven wear of the shoulder land portion 34 is determined with the end portion on the outer side in the tire width direction of the circumferential reinforcing layer 145 as criterion. As a result, this has the advantage that the ground contact shape of the tire is made appropriate, and the tire uneven wear resistance performance is increased.

Also, in the pneumatic tire 1, the distance D3 in the tire radial direction between the foot Y of the line drawn from the end portion on the outer side in the tire width direction of the narrower cross belt 142 of the pair of cross belts 142, 143 normal to the tread profile and the point of intersection O and the distance D1 have a relationship such that $0.70 \leq D3/D1 \leq 0.080$ (see FIG. 3). As a result, this has the advantage that the ground contact shape of the tire is further made appropriate, and the tire uneven wear resistance performance is further increased Also, in the pneumatic tire 1, the belt layer 14 includes the large angle belt 141, the pair of cross belts 142, 143 disposed on the outer side in the tire radial direction of the large angle belt 141, the belt cover 144 disposed on the outer side in the tire radial direction of the pair of cross belts 142, 143, and the circumferential reinforcing layer 145 disposed between the pair of cross belts 142, 143, on the inner side in the tire radial direction of the pair of cross belts 142, 143, or on the inner side in the tire radial direction of the large angle belt 141 (see FIGS. 2 and 3). By applying the pneumatic tire 1 having this configuration, it is possible to obtain the significant advantage that the tire uneven wear resistance performance is improved.

Also, in the pneumatic tire 1, the belt cords from which the circumferential reinforcing layer 145 is configured are steel wire, and the number of ends of the circumferential reinforcing layer 145 is not less than 17 ends/50 mm and not more than 30 ends/50 mm.

Also, in the pneumatic tire 1, the elongation of the belt cords from which the circumferential reinforcing layer 145 is configured when they are components when subjected to a tensile load of 100 N to 300 N is not less than 1.0% and not more than 2.5%.

Also, in the pneumatic tire 1, the elongation of the belt cords from which the circumferential reinforcing layer 145 is configured when they are in the tire when subjected to a tensile load of 500 N to 1000 N is not less than 0.5% and not more than 2.0%.

Also, in the pneumatic tire 1, the circumferential reinforcing layer 145 is disposed on the inner side in the tire width direction from the left and right edge portions of the narrower cross belt 143 of the pair of cross belts 142, 143 (see FIG. 3). Also, the width W of the narrower cross belt 143 and the distance S from the edge portion of the circumferential reinforcing layer 145 to the edge portion of the narrower cross belt 143 are in the range such that $0.03 \leq S/W$. In this configuration, the positional relationship S/W of the edge portions of the cross belts 142, 143 and the edge portions of the circumferential reinforcing layer 145 is made appropriate, and this has the advantage that it is possible to reduce the strain that is produced in the rubber material around the circumferential reinforcing layer 145.

Also, in the pneumatic tire 1, the width W of the narrower cross belt 143 and the width Ws of the circumferential reinforcing layer 145 are within the range such that $0.60 \leq Ws/W$.

Also, in the pneumatic tire 1, the width Ws of the circumferential reinforcing layer 145 relative to the tire developed width TDW (not illustrated on the drawings) is in the range such that $0.65 \leq Ws/TDW \leq 0.80$. In this configuration, the width Ws and the tire developed width TDW are in the range such that $Ws/TDW \leq 0.80$, so the width Ws of the circumferential reinforcing layer 145 is made appropriate. This has the advantage that fatigue failure of the belt cords is suppressed at the end portion of the circumferential reinforcing layer 145. Also, the width Ws and the tire developed width TDW are in the range such that $0.65 \leq Ws/TDW$, this has the advantage that the ground contact shape of the tire is made appropriate, and the tire uneven wear resistance performance is increased.

Target of Application

It is preferable that the pneumatic tire 1 be applied for a heavy-duty pneumatic tire. A heavy-duty tire has heavier loads during use compared with the tires for a passenger car. Also, the difference in diameter between the region where the circumferential reinforcing layer is disposed and the region on the outer side in the tire width direction increases, so uneven wear can easily occur in the shoulder land portion. Therefore, applying the present technology to heavy-duty tires leads to more significant uneven wear suppression effect.

Also, preferably, the pneumatic tire 1 is applied to a tire with an aspect ratio within the range not less than 40% and not more than 70%, in the state where the tire is assembled on a standard rim, the regular inner pressure is applied to the tire, and the regular load is applied. In addition, the pneumatic tire 1 as in the present embodiment is preferably used as a pneumatic tire for heavy loads, such as buses or trucks and the like. In a tire having this aspect ratio (in particular, heavy-duty tires for buses or trucks and the like), the ground contact shape can easily become hourglass shaped, so uneven wear can easily occur in the shoulder land portion. Therefore, by applying the pneumatic tire 1 to tires having this aspect ratio, it is possible to obtain a significant uneven wear suppression effect.

Also, preferably, the pneumatic tire 1 is applied to a tire having the tire ground contact edge T in the edge portion on the outer side in the tire width direction of the shoulder land portion 34, as illustrated in FIG. 2. In this configuration, uneven wear can easily occur in the edge portion of the shoulder land portion 34. Therefore, by applying the pneumatic tire 1 to tires having this configuration, it is possible to obtain a significant uneven wear suppression effect.

EXAMPLES

FIG. 5 is a table showing the results of performance testing of pneumatic tires according to the embodiments of the present invention.

In the performance testing, a plurality of mutually differing pneumatic tires were evaluated for (1) uneven wear resistance performance and (2) belt durability (see FIG. 5). Also, pneumatic tires with a tire size 445/50R22.5 were assembled on a rim having a rim size of 22.5×14.00, and an air pressure of 900 kPa and a load of 4625 kg/tire were applied to these pneumatic tires. Also, the pneumatic tires were mounted on a 6×4 tractor and trailer test vehicle.

(1) In the evaluation of the uneven wear resistance performance, the test vehicle was driven for 100,000 km on normal paved roads, then the amount of uneven wear in the shoulder land portion (the difference in the amount of wear in the edge portion on the outer side in the tire width direction of the shoulder land portion and the amount of wear at the outermost circumferential main groove) was measured. Evaluations were performed by indexing the measurement results with the Conventional Example as the standard score (100). In this evaluation, the larger the number the more desirable, and if the number is 103 or greater it can be said that the uneven wear resistance performance is superior.

(2) In the evaluation of the belt durability, low pressure durability tests were carried out using an indoor drum testing machine. Also, every 24 hours the above load was increased by 5% while driving at a speed of 45 km/h, and the distance driven was measured when the tire broke down. Evaluations were performed by indexing the measurement results with the Conventional Example as the standard score (100). In this evaluation, the larger the number the more desirable, and if the number is 97 or greater it can be said that the tire durability is properly maintained.

The pneumatic tire 1 according to Working Examples 1 to 5 and the pneumatic tire of the Conventional Example had the configurations illustrated in FIGS. 1 to 3. Also, the tire external diameter R was R=1010 mm, and the tire developed width TDW was TDW=385 mm. Also, the belt cords from which the circumferential reinforcing layer 145 was configured were steel wire, and the number of ends of the circumferential reinforcing layer 145 was 20 ends/50 mm. Also, the elongation of the belt cords of the circumferential reinforcing layer 145 when in the tire when subjected to a tensile load of 500 N to 1000 N was 1.0%.

As shown in the test results, in the pneumatic tire 1 according to Working Examples 1 to 13, the belt durability was maintained, and it was possible to improve the uneven wear resistance performance.

What is claimed is:

1. A pneumatic tire, comprising a belt layer that is formed by laminating a pair of cross belts and a circumferential reinforcing layer, wherein
    a tire external diameter R at a point of intersection O of a tire equatorial plane and a tread profile, a distance D1 in a tire radial direction between a tire ground contact edge T and the point of intersection O, and a distance D2 in the tire radial direction between a foot X of a line drawn from an end portion in a tire width direction of the circumferential reinforcing layer normal to the tread profile and the point of intersection O have a relationship such that $0.010 \leq D1/R \leq 0.015$ and $0.27 \leq D2/D1 \leq 0.30$; and
    a width Ws of the circumferential reinforcing layer relative to a tire developed width TDW is within the range such that $0.65 \leq Ws/TDW \leq 0.80$.

2. The pneumatic tire according to claim 1, wherein a distance D3 in the tire radial direction between a foot Y of a line drawn from an end portion on an outer side in the tire width direction of a narrower cross belt of the pair of cross belts normal to the tread profile and the point of intersection O, and the distance D1 have a relationship such that $0.70 \leq D3/D1 \leq 0.80$.

3. The pneumatic tire according to claim 1, wherein the belt layer includes a large angle belt, the pair of cross belts disposed on an outer side in the tire radial direction of the large angle belt, a belt cover disposed on an outer side in the tire radial direction of the pair of cross belts, and the circumferential reinforcing layer disposed between the pair of cross belts, on the inner side in the tire radial direction of the pair of cross belts, or on the inner side in the tire radial direction of the large angle belt.

4. The pneumatic tire according to claim 1, wherein belt cords from which the circumferential reinforcing layer is configured are steel wire, and the number of ends of the circumferential reinforcing layer is not less than 17 ends/50 mm and not more than 30 ends/50 mm.

5. The pneumatic tire according to claim 1, wherein elongation of belt cords from which the circumferential reinforcing layer is configured when subjected to a tensile load of 100 N to 300 N is not less than 1.0% and not more than 2.5% when the belt cords are components of the pneumatic tire.

6. The pneumatic tire according to claim 1, wherein the elongation of belt cords from which the circumferential reinforcing layer is configured when subjected to a tensile load of 500 N to 1000 N is not less than 0.5% and not more than 2.0% when the belt cords are in the pneumatic tire.

7. The pneumatic tire according to claim 1, wherein the circumferential reinforcing layer is disposed on an inner side in the tire width direction from left and right edge portions of a narrower cross belt of the pair of cross belts, and
    a width W of the narrower cross belt and a distance S from the edge portion of the circumferential reinforcing layer to the edge portion of the narrower cross belt are within the range such that $0.03 \leq S/W$.

8. The pneumatic tire according to claim 1, wherein the circumferential reinforcing layer is disposed on an inner side in the tire width direction from left and right edge portions of a narrower cross belt of the pair of cross belts, and
    the width W of the narrower cross belt and the width Ws of the circumferential reinforcing layer are within the range such that $0.60 \leq Ws/W$.

9. The pneumatic tire according to claim 1, wherein belt cords from which the circumferential reinforcing layer is configured are steel wire.

10. The pneumatic tire according to claim 1, wherein a number of ends of the circumferential reinforcing layer is not less than 17 ends/50 mm and not more than 30 ends/50 mm.

11. The pneumatic tire according to claim 1, wherein the elongation of belt cords from which the circumferential reinforcing layer is configured when subjected to a tensile load of 500 N to 1000 N is not less than 1.0% and not more than 2.0% when the belt cords are in the pneumatic tire.

12. The pneumatic tire according to claim 1, wherein the circumferential reinforcing layer is disposed on an inner side in the tire width direction from left and right edge portions of a narrower cross belt of the pair of cross belts.

13. The pneumatic tire according to claim 1, wherein a width W of a narrower cross belt of the pair of cross belts and a distance S from the edge portion of the circumferential reinforcing layer to the edge portion of the narrower cross belt are within the range such that $0.03 \leq S/W$.

14. The pneumatic tire according to claim 1, wherein the width W of a narrower cross belt of the pair of cross belts and the width Ws of the circumferential reinforcing layer are within the range such that $0.60 \leq Ws/W$.

15. The pneumatic tire according to claim 1, wherein the pneumatic tire is a heavy-duty pneumatic tire.

16. The pneumatic tire according to claim 1, wherein
    a distance D3 in the tire radial direction between a foot Y of a line drawn from an end portion on an outer side in the tire width direction of a narrower cross belt of the pair of cross belts normal to the tread profile and the point of intersection O, and the distance D1 have a relationship such that 0.70<D3/D1<0.80, the circumferential reinforcing layer is disposed on an inner side in the tire width direction from left and right edge portions of a narrower cross belt of the pair of cross belts, and the width W of the narrower cross belt and the width Ws of the circumferential reinforcing layer are within the range such that $0.60 \leq Ws/W$.

17. The pneumatic tire according to claim 1, wherein the tire ground contact edge T is defined by a non-curved edge.

* * * * *